(12) United States Patent
Tournour et al.

(10) Patent No.: US 6,827,111 B1
(45) Date of Patent: Dec. 7, 2004

(54) FOOD PROCESSING MACHINE WITH INCREASED MOLD PLATE FILL AREA AND STROKE

(75) Inventors: Robert Tournour, Plymouth, WI (US); Richard A. Payne, Plymouth, WI (US)

(73) Assignee: Tomahawk Manufacturing, Inc., Sheboygan, WI (US)

( * ) Notice: Subject to any disclaimer, the term of this patent is extended or adjusted under 35 U.S.C. 154(b) by 0 days.

(21) Appl. No.: 10/635,162

(22) Filed: Aug. 7, 2003

Related U.S. Application Data (60) Provisional application No. 60/423,449, filed on Nov. 4, 2002.

(51) Int. Cl.[7] .................................................. B65B 1/04
(52) U.S. Cl. ......................... 141/12; 141/71; 425/572; 425/574; 425/575; 425/556
(58) Field of Search .............................. 141/12, 71–73, 141/67, 81; 425/572–575, 55; 426/513

(56) References Cited

U.S. PATENT DOCUMENTS

| | | | |
|---|---|---|---|
| 4,054,967 A | | 10/1977 | Sandberg et al. |
| 4,097,961 A | * | 7/1978 | Richards ..................... 425/556 |
| 4,872,241 A | | 10/1989 | Lindee |
| 4,996,743 A | | 3/1991 | Janssen |
| 6,749,421 B2 | * | 6/2004 | Sandberg ..................... 425/556 |

* cited by examiner

*Primary Examiner*—Steven O. Douglas
(74) *Attorney, Agent, or Firm*—Donald Cayen (57) ABSTRACT

A prior top fill food processing machine is converted to increase production without increasing operating speed. A tooling set and a drive mechanism cooperate to increase the mold plate stroke and fill area. The tooling includes a fill plate and a breather plate with increased lengths that accommodate the increased mold plate fill length and stroke and that assure adequate seal-off. The pump box top plate of the prior machine is unchanged and serves as a reference for dimensioning the tooling set. The fill plate and breather plate extend in longitudinal directions from front and back edges of the top plate. The tooling is changeable into different combinations of mold plate cavity numbers and sizes and also different configurations for the fill plate fill slots. In a preferred embodiment, the mold plate fill area is increased 42 percent and the stroke is increased 33 percent relative to the prior machine.

37 Claims, 5 Drawing Sheets

BACKGROUND INFORMATION

FIG. 1
BACKGROUND INFORMATION

FIG. 2
BACKGROUND INFORMATION

FOOD PROCESSING MACHINE WITH INCREASED MOLD PLATE FILL AREA AND STROKE

This application claims priority from Provisional U.S. Patent Application Ser. No. 60/423,449 filed Nov. 4, 2002.

BACKGROUND OF THE INVENTION

1. Field of the Invention

This invention pertains to food processing machines, and more particularly to food processing machines capable of high production of individual food products for each cycle of a mold plate.

2. Description of the Prior Art

Various types of machines have been developed to form individual items of food products from a bulk supply of food material. For example, U.S. Reissue Pat. No. 30,096 describes a prior machine capable of producing individual patties from a bulk supply of ground meat. U.S. Pat. No. 4,872,241 shows a machine for making individual nuggets from whole muscle meat.

Figure 1:
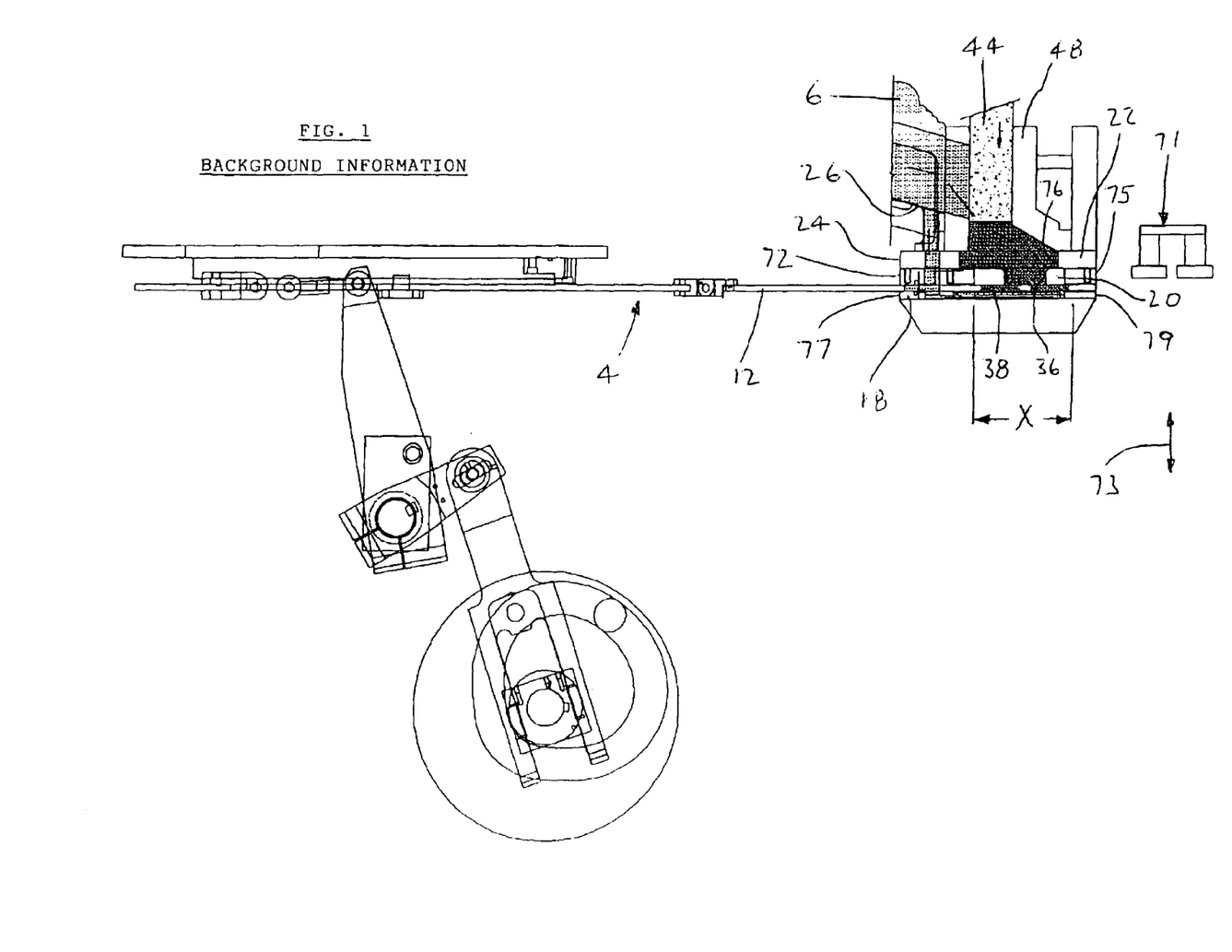
FIG. 1 is a schematic view of the drive linkage, mold plate, and filling section of a typical prior food processing machine.
Figure 2:
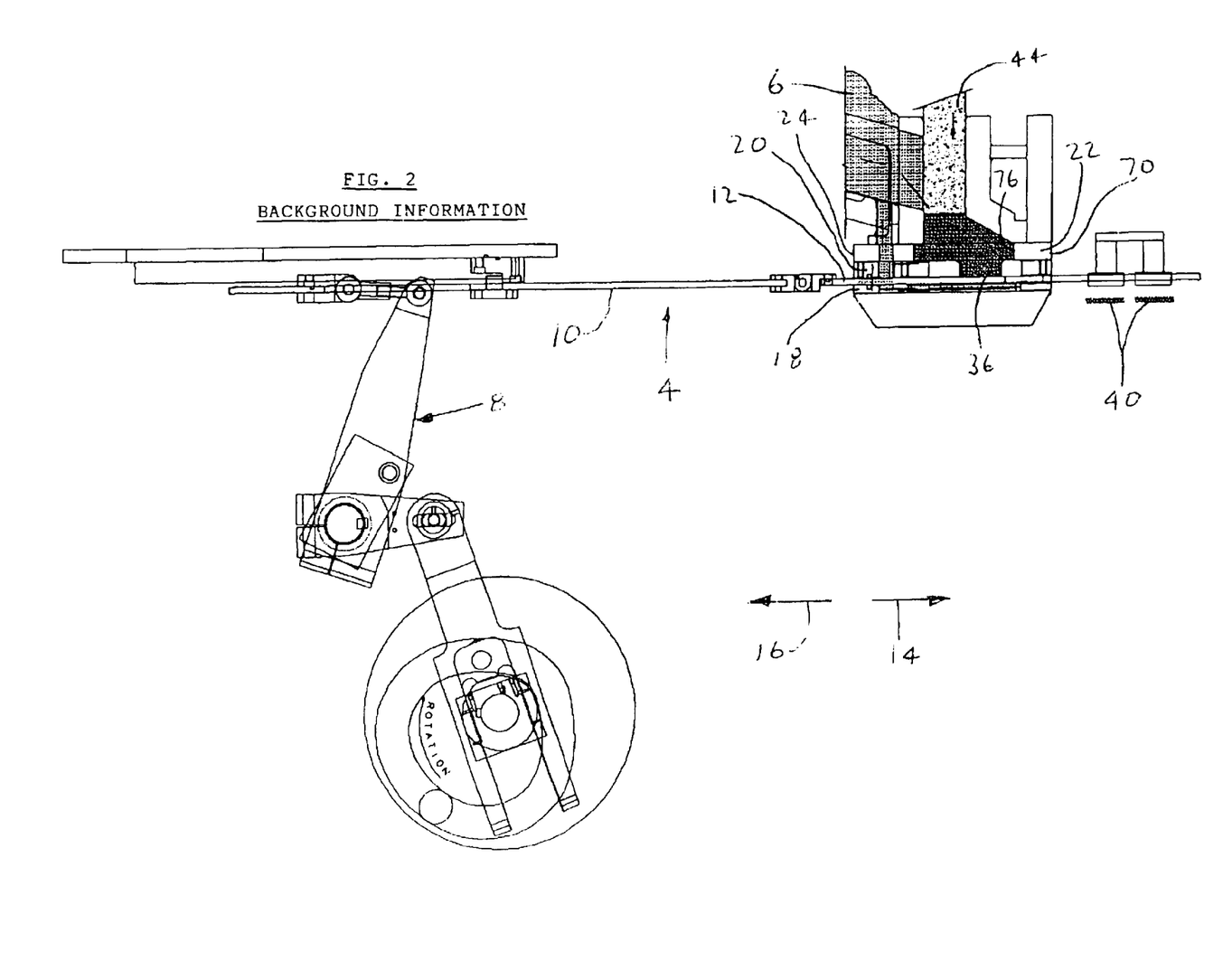
FIG. 2 is a view similar to FIG. 1, but showing the mold plate advanced to an eject position.

FIGS. 1 and 2 show in schematic form a typical prior machine 4 that processed bulk food material 6 into individual items 40. The particular machine 4 was a Model F19 machine manufactured by Formax Company of Mokena, Ill. The Formax machine was highly successful in processing large quantities of bulk food material 6 into typical food items 40 such as poultry nuggets and beef patties.

The food material 6 was stored in a hopper 26. The hopper 26 opened into a pump box 48 that had a top plate 22. The top plate 22 had a back edge 24 and a front edge 70. Inside the pump box 48 was a plunger 44. The hopper, pump box, top plate, and plunger 44 were major and permanent components of the prior machine 4. Changing any of those components was a major undertaking. Consequently, for practical purposes, the top plate back and front edges 24 and 70, respectively, were permanently fixed on the machine.

The prior machine 4 further comprised a drive linkage 8 that included a slide plate 10. The drive linkage 8 reciprocated the slide plate 10 in longitudinal directions 14 and 16. The drive linkage 8 depicted in FIGS. 1 and 2 represents a cam and follower mechanism that was standard equipment for the prior Formax machine. The cam and follower mechanism reciprocated the slide plate with a nine inch stroke. Like the machine pump box 48 and top plate 22, it was difficult to change the stroke of the drive linkage. International Patent Publication Number WO 02/102166 A1 confirms the difficulty of changing the stroke length of the prior food processing machine.

Hinged to the slide plate 10 was a mold plate 12. Accordingly, the mold plate 12 also reciprocated with a nine inch stroke. In the mold plate 12 were a number of cavities 38. The cavities 38 could be of different shapes, such as round, elliptical, or irregular. The cavities were arranged in one or more rows transverse to the longitudinal directions 14 and 16.

The mold plate 12 was located between a fill plate 20 and a breather plate 18. The fill plate 20 was adjacent the pump box top plate 22. The fill plate had one or more fill slots 36 through it. The fill plate 20 had a back edge 72 and a front edge 75 that were spaced approximately 12 inches apart. The breather plate 18 was spaced from the fill plate by a distance slightly greater that the thickness of the mold plate. The breather plate had back and front edges 77 and 79, respectively, that were generally aligned with the fill plate back and front edges 72 and 75.

The drive linkage 8 reciprocated the slide plate 10 and mold plate 12 between a fill position and an eject position. When the mold plate was in the fill position, FIG. 1, the cavities 38 were located so as to be in communication with the fill slot 36 in the fill plate 20. At that point, the plunger 44 operated to pump food material 6 from the pump box 48 through an opening 76 in the top plate 22, through the fill plate fill slot, and into the mold plate cavities. Air in the cavities was forced into small holes in the breather plate 18 and vented to the atmosphere. When the cavities were filled, the drive linkage reciprocated the mold plate to the eject position, FIG. 2. At the eject position, the mold plate cavities were beyond the front edge 79 of the breather plate and the front edge 75 of the fill plate. A knockout mechanism 71 reciprocated in vertical directions 73 to eject the food product from the cavities in the form of individual items 40.

In the prior machine 4, there was a limited area of the mold plate 12 that could be used for the cavities 38. That area, called the fill area, was determined by the maximum usable transverse width of the mold plate and by the longitudinal fill length. The fill length was the maximum longitudinal length of the mold plate that could be used for the cavities 38 and is shown as dimension X. The fill length X was limited by several factors, including the distance from the leading edges of the cavities closest to the fill plate front edge 75 when the mold plate was at the fill position, by the distance from the trailing edges of the cavities closest to the fill plate back edge 72 when the mold plate was at the fill position, and by the length of the stroke of the mold plate. In the prior machine, the fill length was approximately six inches, or 67 percent of the stroke length of nine inches. Consequently, one row of six inch diameter cavities was the maximum cavity size that could be incorporated into a prior mold plate. Another cavity pattern, as shown, was two rows of relatively small cavities having approximately two inch diameters.

Unlike the pump box 48, top plate 22, hopper 26, and plunger 44, the mold plate 12, fill plate 20, and breather plate 18 were rather easily installable into and removable from the machine 4. In fact, a particular set of mold plate, fill plate, and breather plate was considered as a tooling set that was interchangeable within the machine with another tooling set of mold plate, fill plate, and breather plate to suit different items 40 and food material 6. It was common practice to provide a machine with several tooling sets that were interchangeably installed and removed from the machine to suit the production requirements at hand.

The production of the prior machine 4 as measured by pounds of material per unit time was limited by the fill area of the mold plate 12 and by the operating speed. If the fill area was utilized to the maximum, the only way to increase the production of the prior machine was to increase its speed of operation. However, the operating speed was limited by vibrations and excessive wear.

U.S. Pat. No. 4,996,743 demonstrates a drive linkage for a mold plate of a food processing machine. The drive linkage of that patent included a hydraulic system that imparted a dwell time to the mold plate when the mold plate was at its fill and eject positions. The drive linkage enabled an input member to rotate continuously but allow proper filling and ejection of cavities in the mold plate. Although the drive linkage of the U.S. Pat. No. 4,996,743 patent worked quite well, it did have certain limitations. Most important, the drive linkage was limited to a mold plate stroke of about nine inches.

Thus, a need exists to upgrade the production capabilities of food processing machines.

SUMMARY OF THE INVENTION

In accordance with the present invention, a food processing machine is provided that increases production without increasing machine operating speed. This is accomplished by converting a prior top fill food processing machine to increase its mold plate stroke and mold plate fill area.

The food processing machine of the invention may be conventional in several respects. A prior machine suitable for converting is a Formax F19 machine. The prior machine comprises a frame, a hopper that holds a quantity of bulk food material, a pump box, and a top plate that is part of the pump box. The hopper, pump box, and top plate are utilized without change in the present invention. Accordingly, the dimensional relationships between the foregoing components do not change.

Increasing the mold plate fill length is achieved through the cooperation of two major structural components that are changed from the prior machine: tooling and a drive mechanism. The tooling of the invention includes the mold plate, a fill plate, and a breather plate. Different tooling sets of mold plates, fill plates, and breather plates can be rather easily installed into and removed from the machine. The different tooling sets of tooling are interchangeable in the machine to suit the particular food processing requirements at hand.

The fill plate is installed under the pump box top plate. The fill plate has one or more fill slots that communicate with the pump box through an opening in the top plate. The mold plate is under the fill plate, and the breather plate is under the mold plate. The mold plate has a series of cavities in it that are sized and shaped to suit the particular food product to be produced from the bulk material. The mold plate reciprocates in longitudinal directions between a fill position and an eject position in response to operation of the drive mechanism.

When the mold plate is at the fill position, food material is pumped from the pump box through the opening in the top plate. The material flows in a downward direction and enters the fill slots in the fill plate, and then flows into the cavities in the mold plate. After the cavities have been filled, the mold plate slides in a forward stroke. Depending on the configuration of the cavities in the mold plate, some cavities may come into communication with the fill plate fill slots only while the mold plate is moving. Ultimately the mold plate reaches the eject position, where individual items are ejected from the cavities.

To increase the mold plate fill area, the mold plate, fill plate, and breather plate are designed with increased longitudinal lengths compared to prior tooling. The relative locations of the fill plate fill slots and the mold plate cavities are also changed in mutually dependent ways. A critical dimension of the invention is the seal-off length. The seal-off length is the distance between the leading edges of the cavities closest to the mold plate leading edge and the front edge of the fill plate when the mold plate is at the position where those cavities lose communication with the fill slots as the mold plate slides in a forward stroke. The seal-off length assures that food material does not flow out the cavities closest to the mold plate leading edge when those cavities are still in communication with the fill slots. To achieve adequate seal-off, the front edge of the fill and breather plates extend forwardly beyond their respective locations in the prior machine. In addition, the interplay between the increased mold plate stroke, the breathing requirements of the cavities, and the seal-off length requires that the back edges of the fill and breather plates extend rearwardly from their respective locations in the prior machine.

Any increase in mold plate fill length above the prior six inch fill length will increase the production of the prior food processing machine without increasing operating speed. We have found that a fill length of approximately 8.50 inches can be obtained by means of the present invention with little or no changes to the major and permanent components of the prior food processing machine such as the pump box and top plate. A fill length of 8.50 inches represents an increase of 42 percent over the fill length of the prior machine.

As mentioned, the dimensional relationships between the hopper, pump box, and top plate do not change when different tooling is installed in the machine. Consequently, the foregoing components are used as references for converting the prior machine in accordance with the present invention. Specifically, it is highly desireable to use the back edge of the top plate as a fixed reference for the tooling. That procedure contributes to the efficient ability of converting the prior food processing machine to accept the interchangeable tooling sets according to the present invention.

To reciprocate the mold plate, the food processing machine further comprises the drive mechanism. In the preferred embodiment, the drive mechanism includes a motor and a speed reducer that rotate a crank arm at a constant speed. The crank arm acts through a lost motion cylinder to oscillate a lever. One arm of the lever is connected to a slide plate. In turn, the slide plate is hinged to the mold plate. A block on the slide plate contacts a stop on the machine frame when the mold plate is at the eject position. In that manner the location of the mold plate at the eject position is accurately controlled, which is important for proper ejection of the items from the mold plate cavities.

The drive mechanism is designed to impart a 12 inch stroke to the slide plate and mold plate. That stroke is three inches or 33 percent greater than was possible with the prior machine and contributes to the increase in the mold plate fill length to approximately 8.50 inches. It is thus seen that the present invention provides a fill length that is approximately 71 percent of mold plate stroke length.

The method and apparatus of the invention, using changed tooling and drive mechanism, thus increase the capacity of a prior food processing machine without increasing the operating speed. Different tooling sets are interchangeably installable into and removeable from the machine to suit different product requirements, even though the same increased mold plate stroke is always used.

Other advantages, benefits, and features of the invention will become apparent to persons skilled in the art upon reading the detailed description of the invention and studying the drawings.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 3:
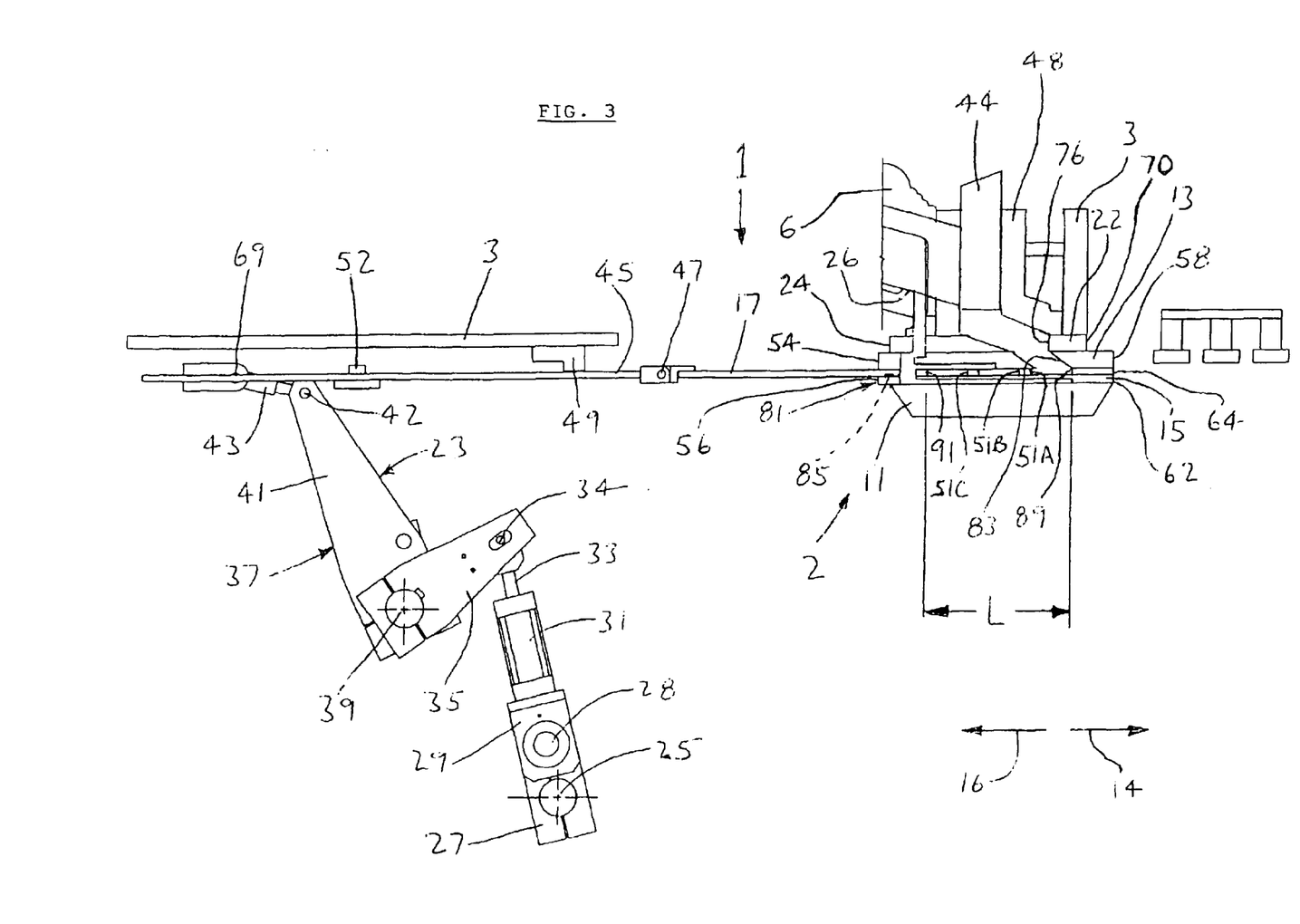
FIG. 3 is a schematic view of portions of the drive mechanism, mold plate, and filling section of the food processing machine of the present invention showing the mold plate at the fill position.

Referring to FIG. 3, a portion of a food processing machine 1 is illustrated that includes the present invention. The food processing machine 1 may be a conversion of a prior Formax F19 machine. The converted food processing machine 1 retains a number of important components of the prior machine. However, the converted machine is capable of greatly increased production.

The food processing machine 1 has a filling station 2 that includes the prior frame 3. The frame 3 supports the prior hopper 26, the pump box 48 with the top plate 22, and a mold cover 11. In the pump box 48 is the plunger 44, and in the top plate 22 is the opening 76. The top plate 22 has the back edge 24 and the front edge 70. A quantity of food material 6 is stored in the hopper 26. The frame 3, hopper, pump box, top plate, and plunger 44 are prior components of the prior food processing machine and do not change in the food processing machine 1 of the invention.

In accordance with the present invention, tooling 81 is installable into and removeable from the machine 1 in a manner that contributes to an increase in production of the machine without an increase in operating speed. The tooling 81 is comprised of a fill plate 13, a breather plate 15, and a mold plate 17. The tooling 81 is installed in the food processing machine 1 with the fill plate 13 under the pump box top plate 22. The mold plate 17 is under the fill plate, and the breather plate 15 is under the the mold plate 17. In the mold plate 17 are a number of cavities 51. The cavities 51 may be aligned longitudinally, or they may be staggered. Further, the cavities can have any of a variety of sizes and shapes, such as circular or rectangular. In the particular construction illustrated, the mold plate has three transverse rows 51A, 51B, and 51C of relatively large cavities. If desired, the mold plate may have more or fewer than three rows of cavities. Also in the mold plate 17 are one or more lubrication slots 85. The lubrication slots 85 are in the surface of the mold plate that is in contact with the breather plate 15. The lubrication slots are on the opposite side of the cavities 51 as the mold plate front edge 64.

There are one or more fill slots 83 in the fill plate 13 that communicate with the top plate opening 76. The particular configuration and locations of the fill slots vary depending on the size, shape, and location of the mold plate cavities 51.

Figure 4:
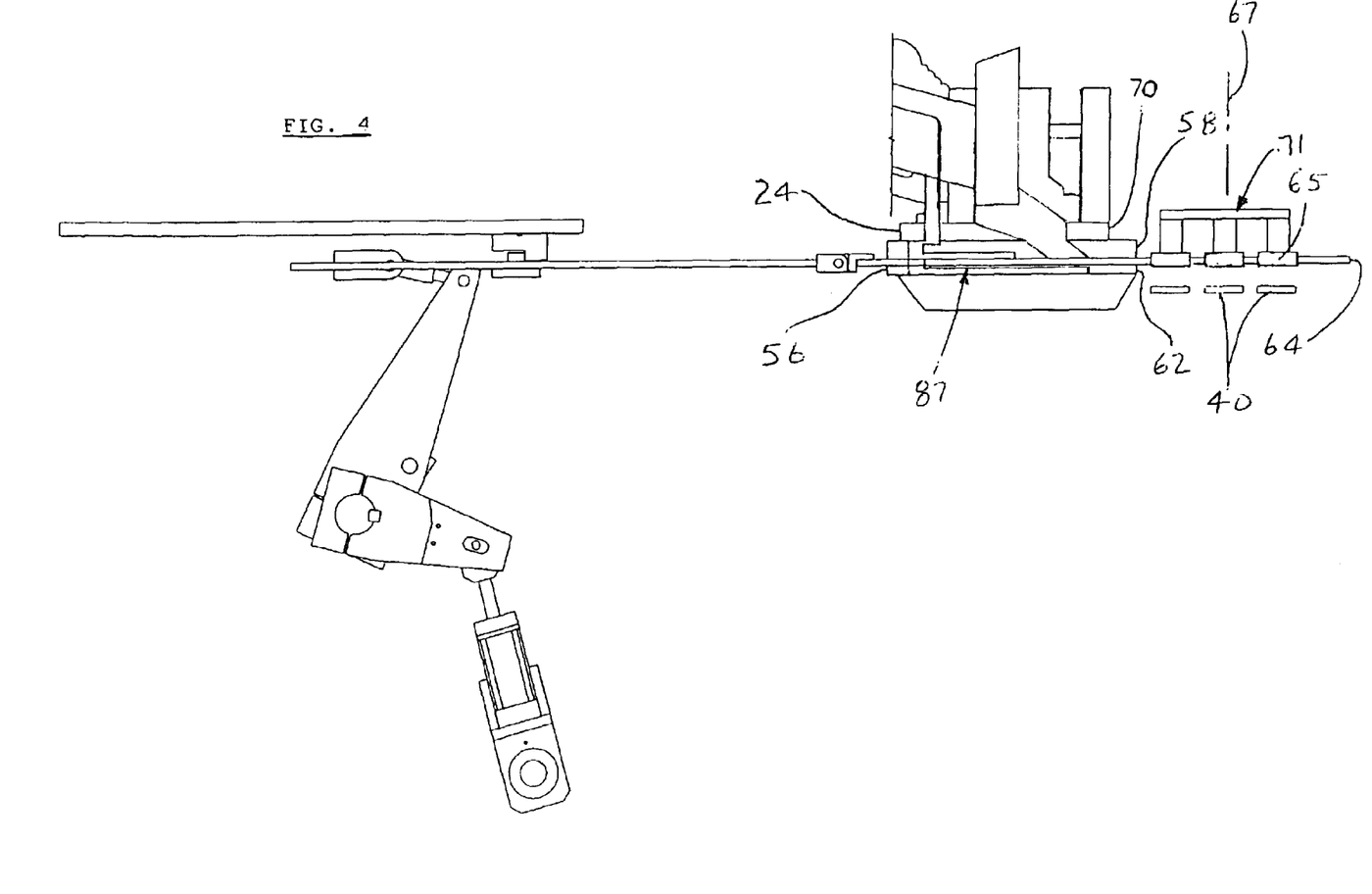
FIG. 4 is a view similar to FIG. 3 but showing the mold plate at the eject position.

The mold plate 17 reciprocates in the longitudinal directions 14 and 16 along a generally horizontal plane. In FIG. 3, the mold plate is shown at a fill position. When the mold plate is at the fill position, at least some of the cavities 51 are in communication with the fill plate fill slot 83. As illustrated, there is one fill slot in the fill plate, which communicates with the row 51A of mold plate cavities when the mold plate is at its fill position. However, the fill plate can be designed with more than one fill slot, if desired. Further, the particular fill slot configuration and location of communication with the cavities varies with different combinations of food materials 6 and cavity arrangements. For example, due to the nature of some food materials, a fill slot 83 that slopes toward the breather plate 15 in the forward direction 14 is used with relatively small cavities so as to assure consistent filling of all the cavities 51. With other food materials and cavity sizes, a fill slot that is generally perpendicular to the directions 14 and 16 is acceptable. In FIG. 4, the mold plate is shown at the eject position.

It is an important feature of the invention that the tooling 81 gives an increased. fill area of the mold plate 17 compared with the tooling used in the prior machine. The mold plate fill area is defined as the usable width of the mold plate in the transverse direction times the usable length L in the longitudinal directions 14 and 16. The mold plate 17 has essentially the same width as the tooling used with the prior Formax F19 machine. Therefore, the increased mold plate fill area is a direct function of an increased fill length L. The fill length L is defined as the maximum longitudinal length of the mold plate that can contain cavities 51. That is, the f ill length is the maximum distance between the leading edges 89 of the cavities in the front row 51A and the trailing edges 91 in the cavities in the back row 51C.

According to one aspect of the invention, the mold plate 17 has a fill length L of approximately 8.50 inches. To achieve that fill length, the components of the tooling 81 have dimensions that differ from those of conventional tooling. In general, the length of the fill plate 13 and breather plate 15 are increased above the prior 12 inches. The particular dimensions may vary depending on the food material 6, the number of rows of cavities 51, the longitudinal length of the cavities, and the configuration of the fill plate fill slot 83. We have found that the foregoing variables can be accommodated within a range that is commercially important by locating the fill plate front edge 58 approximately 1.56 inches in the forward direction 14 from the front edge 70 of the top plate 22. Similarly, the breather plate front edge 62 is 1.56 inches from the top plate front edge. Preferably, the front edge 64 of the mold plate is aligned with the front edges 58 and 62 of the fill and breather plates, respectively, when the mold plate is at its fill position.

Figure 5:
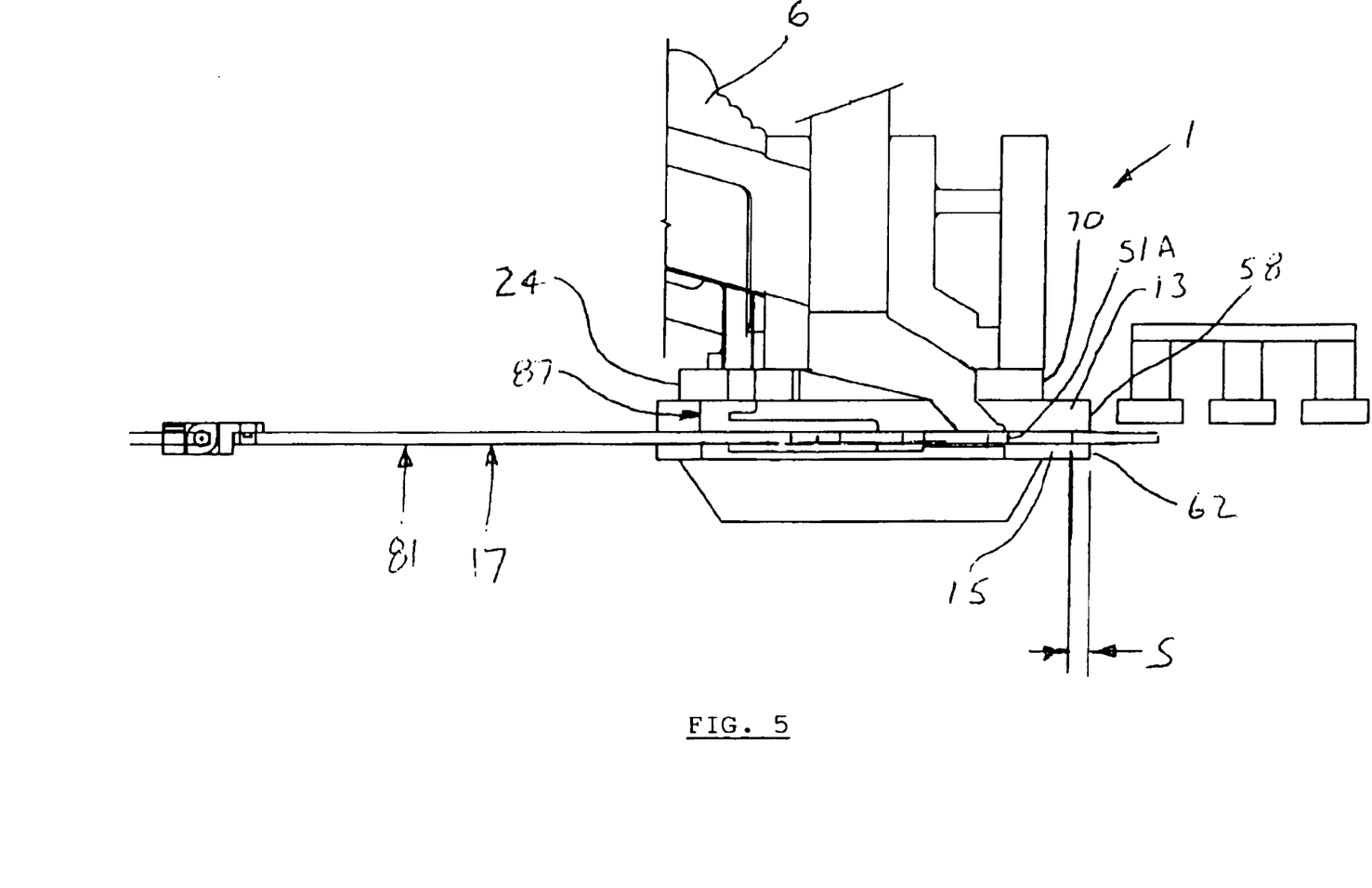
FIG. 5 is an enlarged view showing the mold plate seal-off according to the present invention.

In addition to providing a fill length L of approximately 8.50 inches, the dimensions as given above also provide adequate seal-off for the mold plate 17. It is vital that all the cavities 51 remain sealed between the fill plate 13 and breather plate 15 for all positions of the mold plate during which the cavities are in communication with the fill plate fill slot 83. Referring to FIG. 5, the mold plate cavities 51A have been filled with the food material 6, and the mold plate has advanced in the forward stroke 14 to a position where the cavities 51A have just lost communication with the fill plate fill slot 83. To assure that no food material is pumped from the fill slot through the cavities 51A to the outside of the machine 1, a seal-off length S is built into the tooling 81. Although the exact length of the seal-off S is not critical, it is nevertheless preferred that the seal-off be at least approximately 0.25 inches. The 1.56 inch dimension of the fill plate and breather plate front edges 58 and 62, respectively, from the top plate front edge 70 provides adequate seal-off.

In addition to the tooling 81, a drive mechanism 23 is a necessary part of the machine 1, because the drive mechanism 23 reciprocates the mold plate 17 with an increased stroke relative to the prior Formax machine. The increased stroke cooperates with the changed tooling to enable the mold plate to have the increased fill length L.

In the preferred embodiment, the drive mechanism 23 includes a motor and a gear reducer, not shown but well known to persons skilled in the art. The output shaft 25 of the gear reducer rotates a crank arm 27 at a constant speed. A block 29 has a pivotal connection 28 with the crank arm 27. To the block 29 is mounted the head end of a lost motion hydraulic cylinder 31. The piston rod 33 of the cylinder 31 is connected by a pin 34 to one arm 35 of a lever 37. The lever 37 oscillates about a fixed axis 39 in response to rotating the crank arm. A second arm 41 on the lever is connected by another pin 42 to a link 43. The link 43 connects by a pin 69 to a slide plate 45 that is guided for reciprocation in the machine frame 3. A hinge 47 connects the slide plate 45 to the mold plate 17. By viewing FIGS. 3 and 4, it is seen that rotating the crank arm 27 causes reciprocation of the mold plate. Specifically, FIG. 3 shows the mold plate at its fill position, where it is fully at the end of the retraction stroke 16. FIG. 4 shows the mold plate at the eject position, where it is fully at the end of the forward stoke 14. A block 52 on the slide plate 45 contacts a stop 49 on the frame 3 when the mold plate is at the eject position.

In the illustrated construction, the drive mechanism 23 reciprocates the slide plate 45, and thus the mold plate 17, with a stroke of 12 inches. That is an increase of three inches over the stroke that was available on the prior Formax machine. To obtain the 12 inch stroke, the drive mechanism requires specific dimensions. Important dimensions include a length 14.37 inches for the lever arm 41, a length of about 7.00 inches for the lever arm 35, and a throw of 3.31 inches for the crank arm 27.

As mentioned previously, the top plate 22 remains an unchanged component of the prior machine. For convenience, several dimensions required to suit the conversion of the prior machine into the food processing machine 1 are referred from the top plate back edge 24. Also, to maximize the economy of converting the prior machine, the locations of the axis of rotation of the gear reducer output shaft 25, and of the axis of rotation 39 of the lever 37, are maintained relative to the top plate back edge 24. Those dimensions include a distance of 21.50 inches from the top plate back edge 24 to the axis of rotation of the speed reducer 25. There is a horizontal distance of 41.15 inches from the fill plate back edge to the connection pin 69 of the link 43 with the slide plate 45 when the mold plate 17 is at its fill position. The link 43 has a length of 4.19 inches. There is a nominal distance of 12.62 inches between the connector 28 and the pin 34.

For convenience in referring dimensions to the back edge 24 of the top plate 22, the front edges 58 and 62 of the fill and breather plates 13 and 15, respectively, are 13.56 inches from the top plate back edge. By constructing the tooling 81 and drive mechanism 23 as described, the mold plate 17 has a 12 inch stroke and a 8.50 inch fill length L, and there is adequate seal-off S.

Another important factor in the conversion of the food processing machine 1 from the prior machine concerns the breathing system shown collectively at reference numeral 87. As mentioned, air is expelled from the mold plate cavities 51 while they are being filled with the product 6. The displaced air is vented to the atmosphere. In the food processing machine of the invention, the breathing system 87 includes passages through the breather plate 15, mold plate 17, fill plate 13, and top plate 22 back to the hopper 26. The breathing system may be constructed according to the teachings of our copending U. S. patent application Ser. No. 10/287,028 filed Nov. 4, 2002. To suit the increased stroke length and the increased fill length L, as well as the seal-off S, it is required to extend the breather plate and fill plate in the longitudinal direction 16 relative to the top plate back edge 24. Specifically, the fill plate 13 is lengthened in the direction 16 from the top plate back edge 24 by an amount of 0.75 inches such that the fill plate back edge is at reference numeral 54. The back edge 56 of the breather plate 15 is also approximately 0.75 inches from the top plate back edge 24. Consequently, the overall length of the fill and breather plates is approximately 14.31 inches.

Taking into account the various factors of fill length L, seal-off S, increased stroke, and breathing system 87, it is further necessary to change the length of the mold plate 17 relative to the mold plates of prior tooling. The length of the mold plate used with the tooling of the prior machine was approximately 23 inches, but a length of 28 inches is required for the food processing machine 1. As a consequence, the length of the slide plate 45 of the drive mechanism 23 must be shortened a corresponding amount.

A final change in the food processing machine 1 is that the center 67 of the knockout cups 65 must be 18.50 inches from the top plate back edge 24. All of the foregoing components work together to provide the increased fill length L and mold plate stroke, which results in the increased production capabilities of the food processing machine 1.

In summary, the results and advantages of individual food items 40 can now be more fully realized. The food processing machine 1 produces the food items at a higher production than was previously possible with a given operating speed. This desireable result comes from using the combined functions of the tooling 81 and drive mechanism 23 of the invention. The mold plate 17, fill plate 13, and breather plate 15 constitute the new tooling, which is interchangeable to suit different production requirements. The drive mechanism is designed to reciprocate the mold plate with a 12 inch stroke, which, when combined with the increased lengths of the fill plate, breather plate, and mold plate provides a 8.50 inch fill length. Changes to the slide plate 45 and knockout center 67 are also necessary as part of the conversion process.

It will also be recognized that in addition to the superior performance of the present invention, its construction is as to of modest cost in relation to the benefits it provides. In fact, the cost of converting a prior machine is soon recovered because of the increased productivity.

Thus, it is apparent that there has been provided, in accordance with the invention, a food processing machine with increased mold plate fill area and stroke that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A food processing machine comprising:
   a. a pump box having a top plate with an opening therethrough and a back edge and a front edge;
   b. a fill plate adjacent the top plate and having at least one fill slot therethrough in communication with the top plate opening;
   c. a breather plate spaced from the fill plate;
   d. a mold plate between the fill plate and breather plate and having a back edge and front edge and defining at least one cavity, the mold plate having a fill length between a leading edge and a trailing edge of said at least one cavity that is at least approximately 8.50 inches; and
   e. means for reciprocating the mold plate in longitudinal directions with a predetermined stroke between a fill position whereat said at least one cavity is in communication with said at least one fill plate fill slot, and an eject position whereat said at least one cavity is out of communication with said at least one fill plate fill slot.

2. The food processing machine of claim 1 wherein the fill plate has a back edge at a distance of at least approximately 0.75 inches from the top plate back edge.

3. The food processing machine of claim 1 wherein the fill plate has a front edge at a distance of at least approximately 1.56 inches from the top plate front edge.

4. The food processing machine of claim 1 wherein the breather plate has a back edge at a distance of at least approximately 0.75 inches from the top plate back edge.

5. The food processing machine of claim 1 wherein the breather plate has a front edge at a distance of at least approximately 1.56 inches from the top plate front edge.

6. The food processing machine of claim 1 wherein the mold plate has a row of front cavities each with a leading edge, and a row of back cavities each with a trailing edge, and wherein the leading edges of the row of front cavities are spaced at least approximately 8.50 inches from the trailing edges of the row of back cavities.

7. The food processing machine of claim 1 wherein the means for reciprocating the mold plate reciprocates the mold plate with a stroke of at least approximately 12 inches.

8. The food processing machine of claim 1 wherein the mold plate has front and back edges and a distance of at least approximately 28 inches therebetween.

9. The food processing machine of claim 1 wherein the mold plate has a row of front cavities each with a leading edge and a row of back cavities each with a trailing edge, and wherein the leading edges of the row of front cavities and the trailing edges of the row of back cavities are spaced apart a distance greater than approximately six inches.

10. The food processing machine of claim 1 wherein the ratio of the mold plate fill length to the mold plate stroke is approximately 71 percent.

11. The food processing machine of claim 2 wherein the fill plate has a front edge that is approximately 14.31 inches from the fill plate back edge.

12. Tooling for use in a food processing machine comprising:
   a. a fill plate having front and back edges and a distance therebetween of at least approximately 14.31 inches;
   b. a breather plate having front and back edges and a distance therebetween of at least approximately 14.31 inches; and
   c. a mold plate reciprocable between the fill plate and the breather plate with a predetermined stroke length and having at least one cavity therethrough, a front edge, and a back edge.

13. The tooling of claim 12 wherein the predetermined stroke length is at least approximately 12 inches.

14. The tooling of claim 12 wherein said at least one mold plate cavity has a leading edge and a trailing edge that are spaced apart more than approximately six inches.

15. The tooling of claim 12 wherein:
   a. said at least one mold plate cavity has a leading edge and trailing edge with a predetermined cavity length therebetween; and
   b. the predetermined cavity length is at least approximately 71 percent of the predetermined stroke length.

16. The tooling of claim 12 wherein the mold plate has a row of front cavities each having a leading edge, and a row of back cavities each having a trailing edge, and wherein the distance between the leading edges of the front cavities and the trailing edges of the back cavities is at least approximately 8.50 inches.

17. The tooling of claim 12 wherein:
   a. the mold plate has a row of front cavities each having a leading edge, and a row of back cavities each having a trailing edge; and
   b. the distance between the leading edges of the front cavities and the trailing edges of the back cavities is at least approximately 71 percent of the predetermined stroke length.

18. The tooling of claim 12 wherein the distance between the mold plate front edge and back edge is at least approximately 28 inches.

19. Apparatus useful for producing individual food items from a bulk material comprising:
   a. a fill plate in communication with bulk food material and having front and back edges at a first predetermined distance therebetween;
   b. a mold plate located in a generally horizontal plane under the fill plate and defining at least one cavity with a fill length of at least approximately 8.50 inches;
   c. a breather plate under the mold plate and having front and back edges at a second predetermined distance apart;
   d. means for reciprocating the mold plate along the plane between a fill position and an eject position; and
   e. means for forcing the food material in a downward direction through the fill plate fill slot and into said at least one mold plate cavity when the mold plate is at its fill position.

20. The apparatus of claim 19 wherein the means for reciprocating the mold plate reciprocates the mold plate with a stroke of at least approximately 12 inches.

21. The apparatus of claim 19 wherein the first and second predetermined distances are equal.

22. The apparatus of claim 19 wherein the first predetermined distance is approximately 14.31 inches.

23. The apparatus of claim 19 wherein the second predetermined distance is approximately 14.31 inches.

24. The apparatus of claim 19 further comprising a top plate above the fill plate and having a back edge that is spaced at least approximately 0.75 inches from the fill plate back edge.

25. The apparatus of claim 19 wherein:
   a. the means for reciprocating the mold plate reciprocates the mold plate with a predetermined stroke length; and
   b. the mold plate fill length is at least approximately 71 percent of the predetermined stroke length.

26. The apparatus of claim 19 wherein:
   a. the mold plate defines a row of front cavities each having a leading edge and a row of back cavities each having a trailing edge; and
   b. the mold plate fill length is the distance between the row of front cavities leading edges and the row of back cavities trailing edges.

27. The apparatus of claim 19 further comprising a top plate over the fill plate and having a front edge that is at least approximately 1.63 inches from the fill plate front edge.

28. The apparatus of claim 19 further comprising a top plate over the fill plate and having a back edge that is at least approximately 13.56 inches from the fill plate front edge.

29. The apparatus of claim 28 wherein the breather plate front edge is at least approximately 13.56 inches from the top plate back edge.

30. A method of producing individual items from a bulk food material comprising the steps of:
   a. providing a top plate having front and back edges;
   b. installing a fill plate having at least one fill slot and front and back edges under the top plate;
   c. installing a breather plate having front and back edges under the fill plate;
   d. installing a mold plate having at least one cavity therethrough and having a fill length of at least approximately 8.50 inches between the fill plate and the breather plate;

e. reciprocating the mold plate to a fill position whereat said at least one cavity is in communication with said at least one fill plate fill slot;

f. forcing food material through the top plate in a downward direction through said at least one fill plate fill slot and into said at least one mold plate cavity;

g. reciprocating the mold plate with a predetermined stroke to an eject position; and h. ejecting the food material from the said at least one mold plate cavity.

31. The method of claim 30 wherein the step of installing a fill plate comprises the step of installing a fill plate with a front edge that is at least approximately 13.56 inches from the top plate back edge.

32. The method of claim 30 wherein the step of installing a fill plate comprises the step of installing a fill plate with a back edge that is at least approximately 0.75 inches from the top plate back edge.

33. The method of claim 30 wherein the step of installing a mold plate comprises the step of installing a mold plate having at least one cavity with a trailing edge and a leading edge that are at least approximately 8.50 inches apart.

34. The method of claim 30 wherein the step of installing a mold plate comprises the step of installing a mold plate having a row of first cavities with respective trailing edges and row of second cavities with respective leading edges that are spaced at least approximately 8.50 inches from the row of first cavities trailing edges.

35. The method of claim 30 wherein the step of reciprocating the mold plate comprises the step of reciprocating the mold plate with a stroke of at least approximately 12 inches.

36. The method of claim 30 wherein the step of installing a fill plate comprises the step of installing a fill plate having front and back edges that are at least approximately 14.31 inches apart.

37. The method of claim 30 wherein the step of installing a mold plate comprises the step of installing a mold plate having a fill length that is at least approximately 71 percent as long as the predetermined mold plate stroke.

* * * * *

EX PARTE REEXAMINATION CERTIFICATE (8710th)
United States Patent
Tournour et al.

(10) Number: US 6,827,111 C1
(45) Certificate Issued: Nov. 29, 2011

(54) FOOD PROCESSING MACHINE WITH INCREASED MOLD PLATE FILL AREA AND STROKE

(75) Inventors: Robert Tournour, Plymouth, WI (US); Richard A. Payne, Plymouth, WI (US)

(73) Assignee: Tomhawk Manufacturing, Inc., Sheboygan, WI (US)

Reexamination Request:
No. 90/011,592, Mar. 24, 2011

Reexamination Certificate for:
Patent No.: 6,827,111
Issued: Dec. 7, 2004
Appl. No.: 10/635,162
Filed: Aug. 7, 2003

Related U.S. Application Data (60) Provisional application No. 60/423,449, filed on Nov. 4, 2002.

(51) Int. Cl.
*A22C 7/00* (2006.01)
*B65B 1/04* (2006.01)

(52) U.S. Cl. .............................. 141/12; 141/71; 425/556; 425/572; 425/574; 425/575

(58) Field of Classification Search ........................ None
See application file for complete search history.

(56) References Cited

To view the complete listing of prior art documents cited during the proceeding for Reexamination Control Number 90/011,592, please refer to the USPTO's public Patent Application Information Retrieval (PAIR) system under the Display References tab.

*Primary Examiner* — Peter C. English (57) ABSTRACT

A prior top fill food processing machine is converted to increase production without increasing operating speed. A tooling set and a drive mechanism cooperate to increase the mold plate stroke and fill area. The tooling includes a fill plate and a breather plate with increased lengths that accommodate the increased mold plate fill length and stroke and that assure adequate seal-off. The pump box top plate of the prior machine is unchanged and serves as a reference for dimensioning the tooling set. The fill plate and breather plate extend in longitudinal directions from front and back edges of the top plate. The tooling is changeable into different combinations of mold plate cavity numbers and sizes and also different configurations for the fill plate fill slots. In a preferred embodiment, the mold plate fill area is increased 42 percent and the stroke is increased 33 percent relative to the prior machine.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-37 is confirmed.

* * * * *